United States Patent [19]

Kaganovsy et al.

[11] 4,372,818
[45] Feb. 8, 1983

[54] APPARATUS FOR THE DISTILLATION AND RECTIFICATION OF MIXTURES

[75] Inventors: Yaacov Kaganovsy, Ramat-Gan; Yosef Kustanovich, Rechovot; Shimshon Shmuter; Vadim Gelfer, both of Ramat-Gan; Shimon Muchnik, Tel-Aviv, all of Israel

[73] Assignee: Hydrola Ltd., Bat-Yam, Israel

[21] Appl. No.: 178,636

[22] Filed: Aug. 15, 1980

Related U.S. Application Data

[63] Continuation of Ser. No. 915,182, Jun. 14, 1978, abandoned.

[30] Foreign Application Priority Data

Jun. 14, 1977 [IL] Israel .......................... 52316

[51] Int. Cl.³ .......................... B01D 3/28; B01D 3/30
[52] U.S. Cl. ....................................... 202/83; 202/154; 202/158; 202/175; 202/236; 202/237; 202/265; 202/266; 202/267 R; 202/270; 203/72; 203/86; 203/89; 203/DIG. 19; 285/372; 285/DIG. 12
[58] Field of Search .............. 202/161, 236, 237, 172, 202/173, 175, 174, 83, 270, 265–267, 158, 154, 153; 203/86, 89, 71, 73, DIG. 19, 99, 72; 196/100, 110, 105, 124, 125, 139; 422/260; 159/17 R, 17 P, 6 R, 16 R, 25 R, 6 WH; 285/DIG. 12, 363, 368, 372

[56] References Cited

U.S. PATENT DOCUMENTS

| | | | |
|---|---|---|---|
| 354,734 | 12/1886 | Rankin | 202/237 |
| 887,859 | 5/1908 | Smith | 285/372 |
| 1,089,831 | 3/1914 | Gasser | 202/83 |
| 1,695,619 | 12/1928 | Trautmann | 422/260 |
| 1,818,711 | 8/1931 | Hechenbleikner | 422/260 |
| 1,955,831 | 4/1934 | Raybould | 285/372 |
| 3,080,303 | 3/1963 | Nerheim | 202/161 |
| 3,151,042 | 9/1964 | Koshoot | 202/158 |
| 3,235,292 | 2/1966 | Phillips | 285/372 |
| 3,332,710 | 7/1967 | Doty | 285/DIG. 12 |
| 3,345,049 | 10/1967 | McGlothin | 202/158 |

FOREIGN PATENT DOCUMENTS

414594  6/1925  Fed. Rep. of Germany ...... 202/237

Primary Examiner—Wilbur L. Bascomb, Jr.
Attorney, Agent, or Firm—Wenderoth, Lind & Ponack

[57] ABSTRACT

An apparatus unit for the fractional distillation and rectification of liquid mixtures includes a plurality of horizontal superimposed tubular main sections interconnected in series by a plurality of tubular connecting sections, e.g. U-shaped, to define an elongated space along which liquids and vapors flow. Intimate contact between liquids and vapors and efficient heat and mass transfer are provided by a stirrer rotating within the main section about horizontal axes and magnetically driven from the outside. Suitable inlet and outlet ports and heating and cooling devices are provided. An arrangement for joining the adjacent sections without the use of flanges or threaded portions is provided. A number of such units are preferably associated to form a modular apparatus, the individual units being operatively connected as desired to provide series, parallel or mixed flow of the fluids.

17 Claims, 15 Drawing Figures

APPARATUS FOR THE DISTILLATION AND RECTIFICATION OF MIXTURES

This is a continuation application of Ser. No. 915,182, filed June 14, 1978, now abandoned.

BACKGROUND OF THE INVENTION

1. Field of the Invention

This invention refers to improved apparatus for the fractional distillation and rectification of fluid materials and includes a plurality of components, and more specifically to apparatus units for such purposes and to a modular apparatus comprising a plurality of such units.

2. The Prior Art

The importance and wide uses of distillation and rectification apparatus are well known in the art. A great many types of distillation columns or towers have been designed and described. A typical such apparatus is constituted by an elongated vertical shell defining a processing space in which liquids and vapours flow and contact one another. The mixture to be processed is fed at a suitable point of the apparatus and is heated, generally at the bottom. Evaporation takes place, the vapours rise and are condensed generally at the top of the apparatus. Part of the liquid or all the liquid flows downwards, constituting the reflux. Vapours and reflux contact each other and exchange heat and matter.

The efficiency of a distillation apparatus, which can be expressed in terms of yield and resolution power—both very well known concepts—depends on a number of factors, and of particular importance among them are: (a) an intimate contact between vapours and reflux; (b) a good exploitation of the available space; (c) a good heat insulation. These factors affect on the one hand the good resolution of the original mixture into the components which it is desired to separate, and on the other the amount of material which can be processed in a given space and with a given expenditure of heat. It is obvious that while the desired separation is a datum and must be obtained, it may become too costly if the apparatus is too large and complicated and/or if too much heat is required. Usually there is a certain contrast between process requirements and economical requirements and a compromise of some sort is accepted.

It is a purpose of this invention to provide a distillation and rectification apparatus which is optimal from the viewpoint of all the aforesaid requirements, and in particular achieves excellent resolution and high yields, yet is compact and not cumbersome, is of a simple and economical construction, and has minimal heat expenditures.

It is a further object of the invention to provide an apparatus of modular construction, viz. made up of standard units which may be easily associated and combined in a variety of ways to accomodate and satisfy a wide range of specific process requirements, while being always economical to build and to operate.

These and other objects, which will become apparent as the description proceeds, are attained by the apparatus unit and by the modular apparatus according to the invention.

SUMMARY OF THE INVENTION

The apparatus unit according to the invention is characterized in that it comprises a plurality of successive, substantially horizontal, tubular main sections positioned in substantially parallel relationship, each above the preceding ones and below the following ones. A plurality of tubular connecting sections join the main sections to the immediately preceding and to the immediately following ones, to connect at least a number of the sections in series to define a tortuous elongated space for the flow of the fluid materials to be processed. Means is provided for applying heat to at least one of the main sections and for withdrawing heat from at least another one of the main sections. Stirring means is arranged for agitating the fluid materials flowing through at least some of the sections. Means are provided for introducing fluid material at at least one point into the elongated space and for withdrawing fluid materials at at least two points from the elongated space.

The word "tubular" as herein employed, does not necessarily imply that the tubular sections have circular cross-sections, although this will usually be the case.

The stirring means are preferably of the magnetic type and may each comprise an inner, at least partially ferromagnetic, rotor member carrying stirring implements and an outer stator member for creating a rotary magnetic field for driving the rotor member, the rotor and stator members being located respectively inside and outside a tubular section.

In a preferred embodiment of the invention, the main sections are positioned with their axes substantially lying on a vertical plane and in spaced superimposed relationship, whereby they are enclosed in a longitudinally and vertically elongated parallelepipedal space, the apparatus comprising frame means substantially bounding such parallelepipedal space and supporting the main sections in the positioned relationship.

The modular apparatus according to the invention comprises a plurality of apparatus units as hereinbefore described, arranged in side by side relationship, with the axes of the tubular main and connecting sections of each unit lying substantially on a vertical plane and the vertical planes relative to all units being substantially parallel to and evenly spaced from one another.

The modular apparatus, in a preferred embodiment, comprises a general frame, means in the frame for receiving and supporting a plurality of apparatus units in adjacent relationship, and means for controlling the flow of fluid material into and from the modular apparatus and between the several units thereof.

In a still more preferred embodiment, the flow control means are adapted to provide partially or wholly series and/or parallel flow and/or cross flow from some apparatus units to other apparatus units as required by the particular processing that is to be effected.

Thermal insulation means are preferably provided substantially to enclose the whole modular apparatus, with the optional exception of the parts thereof from which heat is to be withdrawn. When a single apparatus unit is used, thermal insulation means are provided thereof in like manner. No thermal insulation is usually required between adjacent units of the modular apparatus as the temperature differences therebetween are small, but if required, it could be easily provided.

BRIEF DESCRIPTION OF THE DRAWINGS

Other features and advantages of the invention and the apparatus embodying it, as well as the structure of a preferred embodiment, will appear from the following description, with reference to the appended drawings, wherein.

DETAILED DESCRIPTION OF THE INVENTION

With particular reference now to FIGS. 1 to 7, an apparatus unit 10 according to an embodiment of the invention comprises a frame constructed in any suitable way, e.g. including, schematically, a base 11, upright structure 12 fixed thereto, a top brace 13 fixed to structure 12, and a central support section for the stirring means generally indicated at 14 (or a plurality of such structures, as may be required by the number of stirrers.). Each upright structure 12 comprises, in this embodiment, two uprights 15, a top cross-piece 16, and a number of slantedly disposed elements 17, being in this embodiment rods fixed to the uprights 15 at an angle e.g. of 45°. The whole frame unit in this embodiment, is supported on wheels 18, for purposes hereinafter explained.

The space through which the fluids flow, viz. the vapours rise and the reflux descends, and into which and from which feed and withdrawal of material takes place, viz. the processing space, is defined first of all by tubular main sections 20 which are arranged substantially horizontally one above the other. A moderate departure from the horizontal orientation may be desired in particular cases and is permissible. Likewise, the various sections need not be exactly superimposed, though this is generally desirable for space saving reasons. In the embodiment illustrated, each main section 20 is supported at its opposed ends by the upright structures 12, in the manner shown at a greater scale in FIGS. 5 and 6. Additional support could be provided, if needed, by additional upright structures located intermediate the ends of the sections.

Rods 17 are fixed, as by welding, to uprights 15, and could be oriented in any suitable way, but in this embodiment are so disposed as to define squares having vertical and horizontal diagonals and sides slightly longer than the outer diameter of tube sections 20. These latter are inserted, near their ends, in such squares, and are centered therein by suitable centering means generally indicated at 19.

Figures 7, 8, 9:
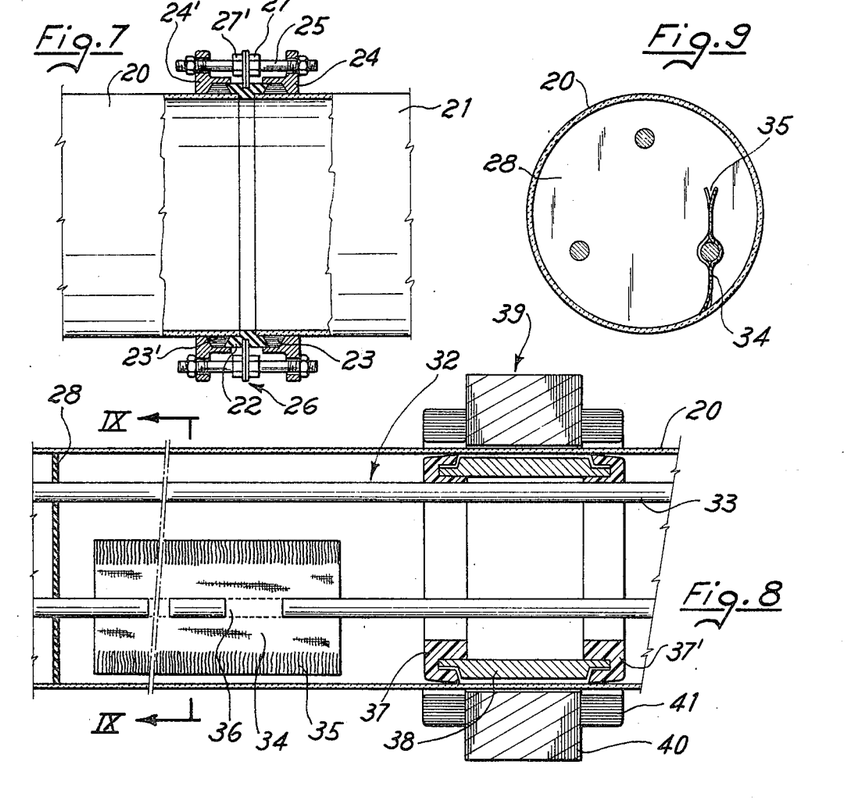
FIG. 7 is a detail, essentially in cross-section, of a portion of the unit of FIG. 1, on an enlarged scale, showing the connection between adjacent tubular sections.
FIG. 8 is an axial cross-section, partly broke off, of a detail of a tubular section, on an enlarged scale, illustrating the stirring means.
FIG. 9 is a transverse cross-section of the detail of FIG. 8, taken on the plane IX—IX of FIG. 8, looking in the direction of the arrows.

Main sections 20 support tubular connecting sections 21, which in this embodiment are U-shaped, the connection being effected in any suitable way, depending of course on the vacuum or pressure which exists within the tubular sections, and, in a preferred embodiment, as shown at FIG. 7. Therein, the tubular sections to be joined are designated by the numerals 20-21, but any two tubular sections may be so connected and they need not necessarily be a main and a connecting section. The sections are preferably of glass but they could be of any material adapted to the fluids they must contain and to the temperature and pressure conditions. Successive sections are joined in any suitable way but preferably by a system claimed per se in another copending application, an embodiment of which will be described. Between the tubular sections, a flange 22 of any suitable material, e.g. sintered PTFE (polytetrafluoroethylene) or metal, is mounted to establish continuity. Flange 22 is laterally engaged by two rings 23-23' of plastically yieldable material, e.g. unsintered PTFE or uncured rubber or plastic, mounted on the outside of the tubular sections. Two flanges 24-24' of rigid material, e.g. metal, are mounted on sections 20-21 to define two chambers containing rings 23-23', which thus act as gaskets preventing the leakage of any fluid which may pass between the sections 20-21 and the flange 22. Bolts 25 or other lock means urge flanges 24-24' towards one another. A pair of metal rings, collectively indicated at 26, are retained axially by projections 27-27' of bolts 25 and engage a corresponding groove in flange 22. The tension of the lock means urges the flanges 24-24' against the rings 23-23' to compress them.

The pressure thus created crushes the rings 23-23' against the respective tubular sections, producing a frictional-adhesive engagement of the former with the outer surface of the latter, whereby the traction of the bolts 25 is transmitted to the tubular sections which are urged towards one another, flange 22 being gripped therebetween, to effect a stable connection, which is efficient for any pressure which may be withstood by glass tubes. For higher pressures, requiring the use of metal tubes, other connections, of any suitable known type, could be used, without exceeding the scope of this invention.

It is seen that the connecting sections 21, being alternatively located at the two ends of the unit, connect the main sections in series, to define a tortuous elongated path along which the fluids flow in both directions.

In the embodiment illustrated, there are nine main sections, but this number has no particular significance and may vary in each individual instance depending on the total length of the path desired for the fluids and the length of each section. The bottom section 20a is associated with heating means schematically indicated at 30-30', while the top section 20i is provided with cooling means schematically illustrated as a coil 31. Heating at the bottom to cause evaporation and cooling at the top to cause condensation is of course conventional in distillation apparatus, and in this respect the invention is carried out by known means. Clearly, heating and cooling could be provided elsewhere and by other means than shown, without departing from the invention.

The preferred stirring means adopted are illustrated particularly in FIGS. 8 and 9. They comprise a stirring implement generally indicated at 32, of any convenient configuration, but which in this embodiment comprises a plurality (e.g. three) of rods 33, preferably but not necessarily made of glass, each of which carries one or more stirring paddles 34, consisting e.g. of flexible sheets, preferably of sintered PTFE, having their edges shredded to improve the stirring efficiency, as indicated at 35, and provided with slits 36 through which a respective rod 33 is inserted, passing alternatively on the one and on the opposite side of the sheet, whereby the sheet is bent in zig-zag fashion (as evidenced in FIG. 9 by the presence of a portion thereof seen in elevation and a portion seen in cross-section) and exercises on the rod an elastic pressure which assures an adequate frictional engagement. The rods are mounted on a number of discs 28 which support them in centered relationship within the respective tubular section 20, and are driven by two rings 37-37', preferably of sintered PTFE, which are engaged in any suitable way, even by mere frictional-elastic engagement, with a drum 38 of ferromagnetic material, preferably coated with PTFE for chemical protection, which constitutes the rotor of an electric motor the stator of which is located outside the tubular section 20 and comprises a suitable core 40 and windings 41. It is apparent that by conveniently feeding the stator to generate a rotating magnetic field, the rotor will be driven into rotation and will carry with it the rods 33 and the stirring paddles 34 to agitate the fluids within tubular section 20.

Figure 1:
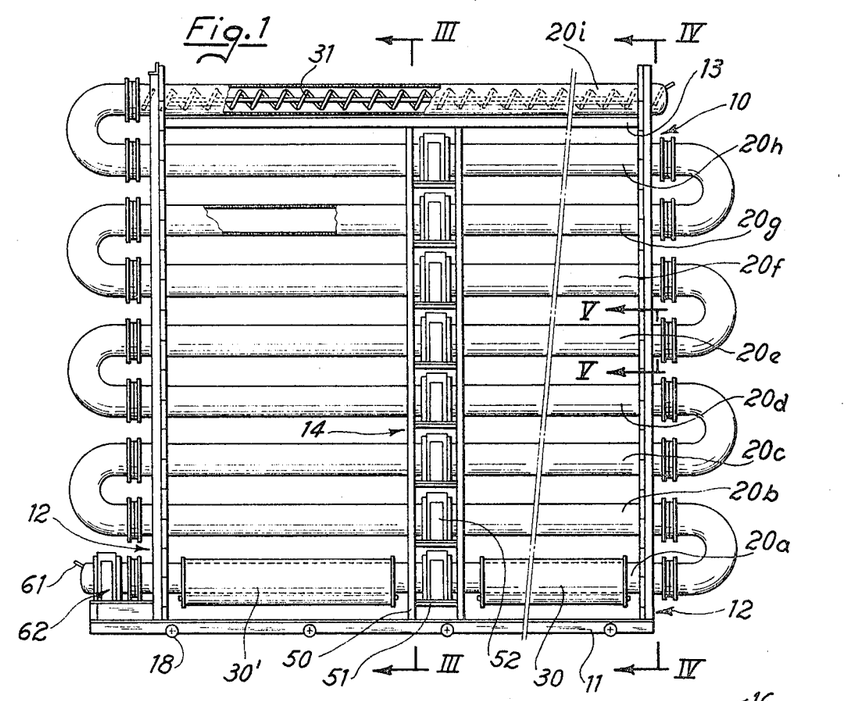
FIG. 1 is a vertical side view of an apparatus unit according to one embodiment of the invention.
Figure 2:
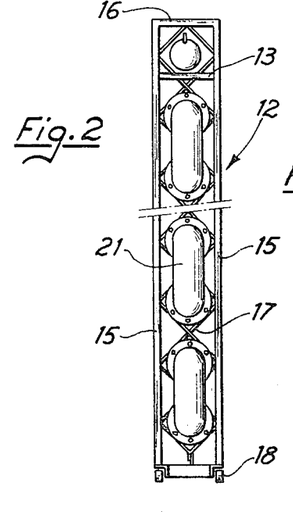
FIG. 2 is an end view, partly broken off, of the unit of FIG. 1, seen from the right hand side of FIG. 1.
Figure 3:
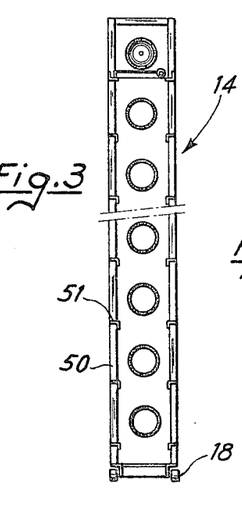
FIG. 3 is a vertical cross-section, partly broken off, of the unit of FIG. 1, taken on the plane III—III, looking in the direction of the arrows, with the moving parts, and specifically the stirring means, removed to simplify the drawing.
Figure 4:
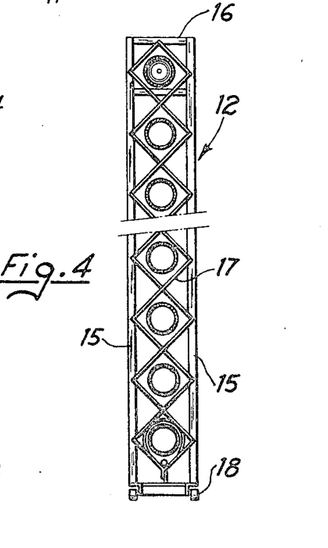
FIG. 4 is a cross-section, partly broken off, of the same unit, taken on the plane IV—IV of FIG. 1, looking in the direction of the arrows, with the omission of the centering devices.
Figure 5:
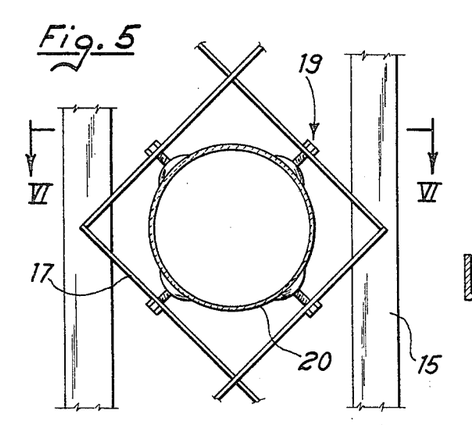
FIG. 5 is a cross-section of a detail of the unit of FIG. 1, on an enlarged scale, taken along plane V—V in FIG. 1.
Figure 6:
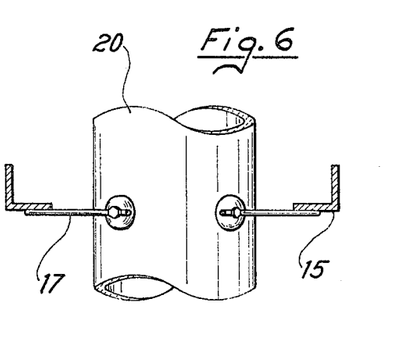
FIG. 6 is a horizontal cross-section of the detail of FIG. 5, taken on the plane VI—VI of FIG. 5, looking in the direction of the arrows.

With reference to FIGS. 1 and 3, the central support section 14 is seen to comprise uprights 50 connected to the base 11 and to the brace 13 and carrying short angle irons 51. Frame generally indicated at 52 and not described in detail as they may be of any suitable structure, support the stators 40-41 and rest on angle irons 51 or on plates, not shown, supported by such irons.

Figure 10:
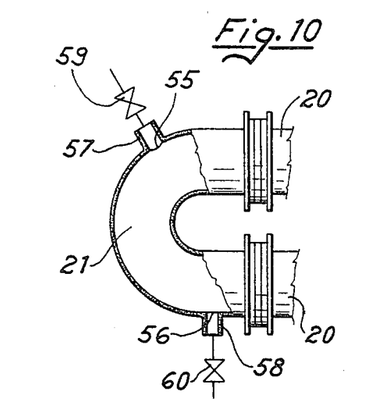
FIG. 10 is a detail, partly in cross-section and partly in elevation, of a connecting section of the unit of FIG. 1.

Ports 55 for the introduction of material into the tube sections and ports 56 for the withdrawal of material therefrom, are provided preferably in the connecting sections 21, as shown particularly in FIG. 10, which illustrates one such section at a moderately enlarged scale. Such ports may be connected with pipes such as 57 and 58. Such pipes, in turn, may be connected to ports 55-56 of other sections, or to sources of material, or to vessels for collecting the outlet material from the apparatus, or to pumps or ejectors, or the like; and means, such as valves symbolically indicated at 59 and 60, may be provided for controlling the flow of the fluids, as desired. These details need not be illustrated, as they will vary from case to case, and are easily provided by persons skilled in the art. It is appreciated that in this way any desired connection may be obtained, and this will be particularly evident when the modular apparatus will be discussed. Correspondingly, any particular connecting section 21 may be provided with both a port 55 and a port 56, or with only one of them, according to whether fluid material must be introduced or drawn off, or with none at all.

Since liquid product is usually withdrawn from the bottom section 20a, through outlet 61, suitable pumping means are usually provided to convey it to whatever vessel or apparatus is intended to receive it. One such pump is generally indicated at 62 in FIG. 1 and may be of any convenient type.

The unit as hereinbefore described is adapted for the construction of a modular apparatus; but if it should be used by itself, without association with other units, thermal insulation would usually be provided. Main section 20i, which acts as a condenser and from which outflow may be drawn by gravity or by other means, would not generally be included in the insulated space.

The high efficiency of the basic section is reached by means of a stirrer instead of a packing as in conventional columns. The flexible paddles 34 with a large surface and a small cross-section are made of a larger size than the radius of the tube container. Therefore, a pressure against the walls of the tube section is created, which is regulated by centrifugal power. The paddle motion creates a thin film of liquid on the tube's wall as on its own surfaces. Such film is always renewed and fresh because of the continuous motion of the paddle. The screwlike gas flow is therefore in continuous contact with the fresh film, which makes the mass and heat transfer extremely efficient. Since any quantity of liquid is enough to create a film, a small liquid holdup is obtainable. The low pressure drop is due to the small cross-section of the paddles. Because of the flexibility of the paddles the accuracy of the dimensions of the tube is immaterial. The stirrer is hermetically closed into the tube and it is driven electromechanically without any mechanical contact.

Figures 11, 12:
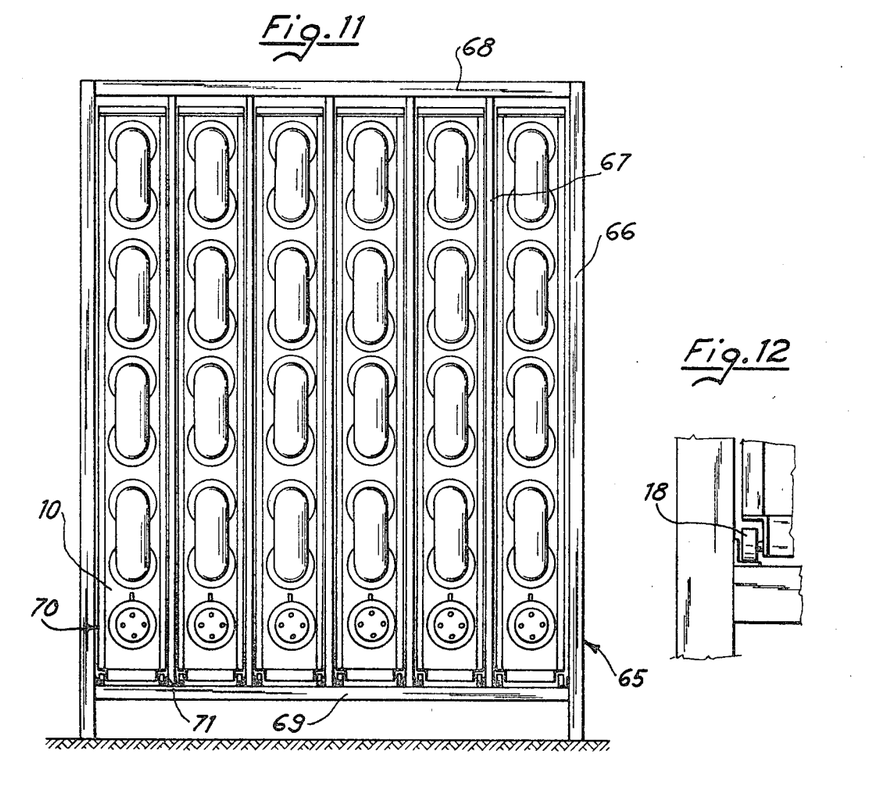
FIG. 11 is an end view of a modular apparatus resulting from the assembly of a plurality of units similar to that of the preceding figures, the fluid inlet and outlet means being omitted.
FIG. 12 is a detail of FIG. 11 on an enlarged scale.
Figure 14:
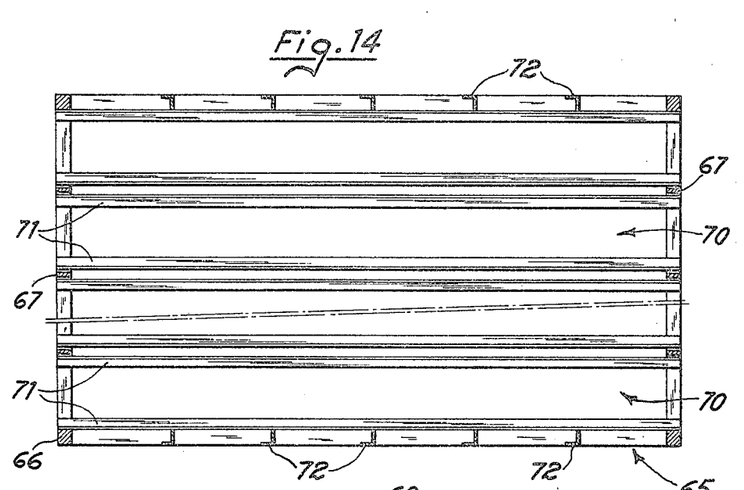
FIG. 14 is an illustration, in horizontal cross-section, of a general frame for the modular apparatus of FIG. 11, wherein the apparatus units have not been introduced.

Preferably, however, the apparatus unit described is associated with a number of like units to constitute a modular apparatus as schematically illustrated in FIG. 11, in which, to simplify the drawing, the ports 55 and 56 of connecting sections 21 have been omitted. A number of units—in this example, six—are mounted side by side. A general frame 65 is provided in this embodiment, and may be of any suitable, preferably essentially parallelepipedal structure, and as illustrated, as better seen in FIGS. 14 and 15, it comprises corner uprights 66, intermediate end uprights 67, to crossbars 68, bottom crossbars 69, and intermediate side uprights 72, all of which are provided in the number required for the strength and stability of the frame. It is seen that the frame defines, between successive intermediate end uprights 67 and corner uprights 66, cells 70, each of which is adapted to receive and house an apparatus unit 10.

In this embodiment, rails 71 are defined at the sides of the bottom of each cell 70 (see FIG. 14), e.g. by angle irons connected in any suitable way to the adjacent uprights 66 or 67 and to bottom crossbars 69. Wheels 18 of units 10 travel on rails 71. In this way the units may be inserted into and removed from frame 65 in a very rapid and easy way.

Figure 15:
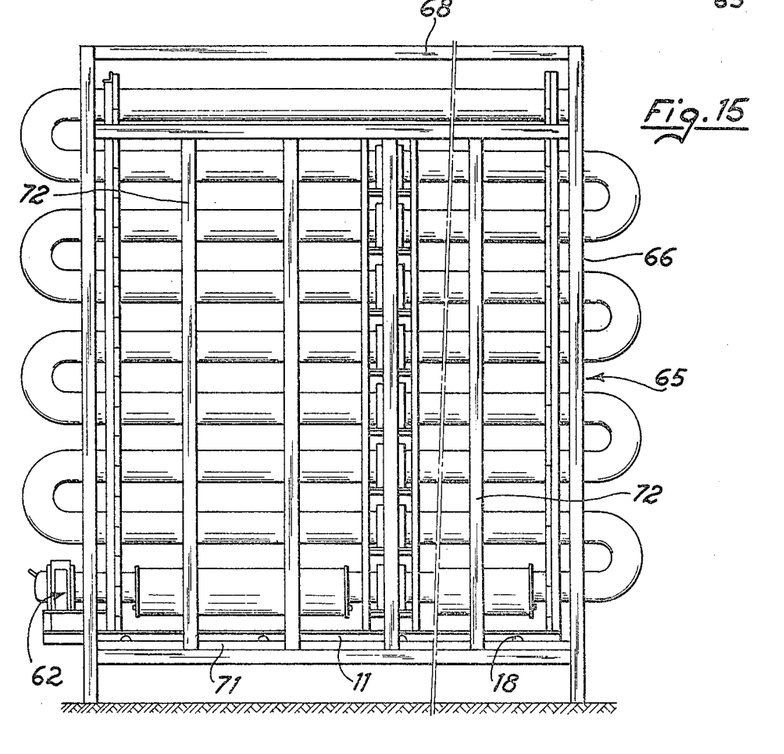
FIG. 15 is a vertical side view, partly broken off, of the modular apparatus of FIG. 11.

As seen in FIG. 15, frame 65 may be short enough to allow connecting sections 21 to protrude at both ends to facilitate their connection each other and with outside apparatus, but frame 65 may completely enclose sections 21, if preferred, at one or at both ends.

It is seen that the apparatus occupies an overall parallelepipedal space made up of a number of narrow elementary parallelepipeds corresponding to the several units. Thermal insulation from the environment is provided by enclosing the whole apparatus within thermally insulating walls, as desired. The sections acting as condensers may be left outside such walls. The thermal insulation means need not be described as they are conventional per se and will be suitably designed for each case. Thermal insulation between adjacent cells 70 is generally not needed, as the adjacent sections of different units are generally at not very different temperatures, but can be easily provided, if needed, either on the frame 65 or on the units themselves.

In the modular apparatus, the question of the functional connection of the various units arises. However, thanks to the structure provided by the invention, any desired connections may be obtained using standard units, and corrspondingly any fractional distillation or rectification problem can be solved by using the same basic modular structure.

Assuming, e.g., that for a specific distillation or rectification problem, a starting liquid mixture is to be introduced into a given main section, then it is possible to feed all the corresponding main sections of all the units from a common feed line thereby creating a parallel feed. The mixture is then apportioned equally among the units. The outlet ports of the several fractions—heads and tails, if there are only two fractions—are likewise connected in parallel, and the combined outflows are conveyed to whatever apparatus is proper. In this case the resolution power will be that of one unit, and the production of outflow will be multiplied by the number of units. The heat expenditure and the construction costs, as well as the encumbrance of the apparatus, however, will be far more favourable than in comparable conventional distillation or rectification apparatus.

On the other hand it is possible to feed only one unit and withdraw outflows from only one other unit, connecting the various units in series, thereby heightening the resolution power.

Intermediate situations can also be created whereby the flow will be partially in parallel and partially in series. Feedbacks may also be introduced. Or fluid material may be caused to flow across the apparatus, viz. from one unit to the other, at intermediate points, which are neither points of feed or withdrawal of outflow.

All these possibilities are afforded by the extreme elasticity and flexibility of the apparatus. In particular, the apparatus may be used in such a way as to produce crossfeed between parallel units, and/or from top and/or bottom points to intermediate points, and/or to draw reflux from intermediate points of some units and feed it to intermediate points of other units, and in general to provide any desired combination of flows, feeds, crossfeeds, backfeeds and withdrawals.

Figure 13:
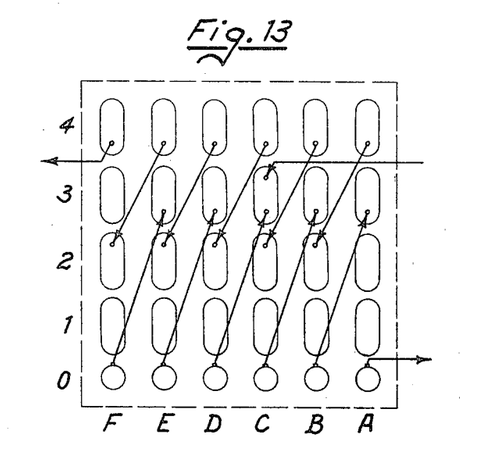
FIG. 13 diagramatically illustrates one way of connecting the various units of FIG. 11 to provide a desired rectification of a mixture of components, in one illustrative application of the apparatus according to an embodiment of the invention.

FIG. 13 illustrates diagrammatically how an apparatus according to the invention may be arranged and interconnected to carry out a particular separation of components. In the figure, only the connecting sections on one end of the apparatus are schematically indicated and the inlets 55 and outlets 56 are symbolized by circles. This does not mean, of course, that inlets and outlets may not be provided at both ends of the apparatus, if desired. In this example, there are six apparatus units, identified by the letters A to F, and in each unit, there are four connecting sections identified by the numerals 1 to 4. The numeral 0 identifies the bottom main sections (20a in FIG. 1). Thus any connecting section or bottom section is identified by the combination of a letter and a numeral. In the case illustrated, as shown, the mixture to be separated into its components or into mixtures of different compositions, is introduced at position C-3. Bottom product is conveyed from positions B-0, C-0, D-0, E-0 and F-0 to positions A-3, B-3, C-3, D-3 and E-3 respectively. Reflux is crossfed from positions A-4, B-4, C-4, D-4 and E-4 to positions B-2, C-2, D-2, E-2 and F-2 respectively. Tail product fractions leave the apparatus from position A-0 and head fractions from position F-4.

The extreme structural simplicity of the apparatus according to the invention eliminates most constructional problems. It is only necessary to select the most suitable material for the tubular sections. Glass, stainless steel, other metals or plastics may be chosen according to corrosion dangers, temperature and pressure.

It should be noted that whereas the connection in series or parallel of the various units conforms to conventional practice in the distillation art, the particular type of crossflow described with reference to FIG. 13 is not conventional and in fact derives from a new and inventive process which can be carried out conveniently by means of the apparatus according to this invention, but is not claimed herein as it forms the subject matter of a different patent application.

It should also be noted that the expression "stirring means" is to be understood as including any device or apparatus or other means that is dynamic in character, viz. which includes movable parts, for agitating the fluids flowing through the apparatus and improving their manual contact, regardless of the nature of the movable parts or of their motion. Thus, e.g., the stirring means could include implements or elements of any kind located within the tubular sections and having an alternating or vibratory motion. Alternatively, no particular stirring implements could be provided and the movable part could be the tubular section itself, which could rotate continuously or to and fro, or vibrate, and so on.

Generally speaking, the invention could be carried out with modifications and adaptations readily understood by persons skilled in the art, without departing from the scope thereof or from the scope of the appended claims.

What we claim is:

1. An apparatus for processing by fractional distillation or rectification a volatile fluid material including a mixture of plural components having different boiling points, said apparatus comprising:
    a plurality of substantially horizontally aligned tubular main sections extending parallel to each other and successively positioned one above the other;
    a plurality of tubular connecting sections joining adjacent ends of adjacent of said main sections, such that at least a number of said sections are connected in series to define an internal space providing an elongated and tortuous path for the flow therethrough of materials to be processed;
    means for introducing volatile fluid material at at least one point into said internal space;
    means for applying heat to at least one of said main sections and thereby for achieving vaporization of at least some of the plural components of said volatile fluid material within said internal space, and means for withdrawing heat from at least another one of said main sections and thereby for condensing at least some of the vapors in said internal space, whereby there are provided throughout said internal space vapor portions and liquid portions in contact;

stirring means for agitating and mixing said liquid and vapor portions flowing through at least some of said sections; and means for withdrawing separate and different said portions from at least two separate locations of said internal space, said at least two separate locations being distinct from one another and from said point at which said volatile fluid material is introduced into said interval space.

2. An apparatus as claimed in claim 1, wherein said heat applying means comprises means for heating a relatively lower said main section, said heat withdrawing means comprises means for cooling a relatively higher said main section, said lower and higher main sections having therebetween at least one intermediate main section which is unheated and uncooled.

3. An apparatus as claimed in claim 1, wherein said main sections are positioned with their axes substantially lying on the same vertical plane and in spaced superimposed relationship, and said main sections are enclosed in a longitudinally and vertically elongated parallelepipedal space, and further comprising frame means substantially bounding said parallelepipedal space and supporting said main sections in such positioned relationship.

4. An apparatus as claimed in claim 1, wherein said stirring means comprises plural stirring units each of which includes an inner at least partially ferromagnetic rotor member located within a respective said section and carrying stirring implements, and an outer stator member located on the outside of said respective section for creating a rotating magnetic field for driving said rotor member, said stirring units being free of any structure penetrating through any of said sections.

5. An apparatus as claimed in claim 4, wherein said stirring units are mounted on superimposed of said main sections at approximately the same longitudinal position thereon, whereby said stator members are positioned radially outwardly of respective said main sections in superimposed relationship in a vertically elongated space internal of a parallelepipedal space enclosing said main sections, and further comprising support means provided in said vertically elongated space for supporting said stator members.

6. An apparatus as claimed in claim 3, wherein said connecting sections are supported by joints to respective of said sections and extend at least in part beyond the longitudinally opposed vertical boundaries of said parallelepipedal space enclosing said main sections.

7. An apparatus as claimed in claim 1, wherein said means for introducing and withdrawing fluid material comprise ports in said connecting sections adapted to be connected to fluid feed and withdrawal means.

8. An apparatus as claimed in claim 1, further comprising thermal insulation enclosing those of said tubular main sections from which heat is not to be withdrawn.

9. An apparatus as claimed in claim 3, wherein said frame means is provided with supporting wheels.

10. An apparatus as claimed in claim 1, further comprising joints for joining adjacent said tubular sections, each said joint comprising a sealing member interposed between the juxtaposed ends of said adjacent tubular sections, at least two gasket elements of yieldable plastic material, each said gasket element being located on the outside surface of one of said tubular sections in the vicinity of the end thereof, rigid members mounted on respective said tubular sections and extending over and about respective said gasket elements, and lock means for applying thrust to said rigid members to displace them towards one another in the closing of the joint, said rigid members being adapted when so displaced to compress said gasket elements against the respective said tubular sections to generate a firm frictional engagement therebetween and to transmit to said tubular sections the thrust applied by said lock means to said rigid members, whereby to urge said tubular sections toward one another and towards said sealing element to maintain the assembly thereof in sealed and locked condition.

11. An apparatus as claimed in claim 10, wherein said tubular sections are made of glass, and said gasket elements are made of unsintered polytetrafluoroethylene.

12. A modular apparatus for processing fluid materials by fractional distillation or rectification, said modular apparatus comprising a plurality of units each in the form of the apparatus of claim 1, said units being arranged in side-by-side relationship, with the axes of the tubular main sections and connecting sections of each said unit lying substantially on a vertical plane, and the vertical planes relative to all said units being substantially parallel to and evenly spaced from one another.

13. A modular apparatus for processing fluid materials by fractional distillation or rectification, said modular apparatus comprising:

a plurality of processing units, each said unit comprising:

a plurality of substantially horizontally aligned tubular main sections extending parallel to each other and successively positioned one above the other;

a plurality of tubular connecting sections joining adjacent ends of adjacent of said main sections, such that at least a number of said sections are connected in series to define an internal space providing an elongated and tortuous path for the flow therethrough of materials to be processed;

means for introducing volatile fluid material at at least one point into said internal space;

means for applying heat to at least one of said main sections and thereby for achieving vaporization of at least some of the plural components of said volatile fluid material within said internal space, and means for withdrawing heat from at least another one of said main sections and thereby for condensing at least some of the vapors in said internal space, whereby there are provided throughout said internal space vapor portions and liquid portions in contact;

stirring means for agitating and mixing said liquid and vapor portions flowing through at least some of said sections; and means for withdrawing separate and different said portions from at least two separate locations of said internal space, said at least two locations being distinct from one another and from said point at which said volatile fluid material is introduced into said internal space;

a general frame;

means in said frame for receiving and housing said plurality of units in adjacent side-by-side relationship, with the axes of the tubular main sections and connecting sections of each said unit lying substantially on a vertical plane, and the vertical planes relative to all said units being substantially parallel to and evenly spaced from one another; and means for controlling the flow of fluid material into and from the modular apparatus and between said plurality of units thereof.

14. A modular apparatus as claimed in claim 13, wherein said flow control means comprise means for providing partly or wholly series and/or parallel flow and/or crossflow from some of said units to other of said units, depending on the particular processing to be effected.

15. A modular apparatus as claimed in claim 14, further comprising means for permitting, discontinuing, and/or controlling, as desired, crossflow of fluid material from one to another of said units.

16. A modular apparatus as claimed in claim 13, wherein said general frame defines a plurality of adjacent vertical parallelepipedal cells each adapted to house therein a respective said unit.

17. A modular apparatus as claimed in claim 16, wherein said general frame includes at the bottom of each said cell, rails for supporting and guiding the respective said unit.

* * * * *